3,079,346
DECONTAMINATING SOLUTION
John B. Jackson, Baltimore, Md., assignor to the United States of America as represented by the Secretary of the Army
No Drawing. Filed May 4, 1960, Ser. No. 26,920
3 Claims. (Cl. 252—153)
(Granted under Title 35, U.S. Code (1952), sec. 266)

The invention described herein may be manufactured and used by or for the Government of the United States of America for governmental purposes without the payment to me of any royalty thereon.

This invention relates to a new composition which has the capability of decontaminating all known persistent chemical warfare agents.

Blistering agents such as the mustard gases are well known for their corrosive effects on human flesh. Nerve gases such as Tabun (dimethylaminoethoxycyanophosphine), Sarin (methylisopropoxyflurophosphine), and others have received much publicity recently as to their deadly effects on humans. Most of these agents are persistent in nature and must be destroyed as soon as possible after they have ben disseminated in order to eliminate their toxic effects.

The primary purpose of this invention is to provide a composition which can decontaminate all types of known persistent chemical agents.

Another object of this invention is to develop a composition which will decontaminate some biological agents as well as chemical agents.

Another object of this invention is to develop a formulation stable under all climatic conditions.

Another object of this invention is to develop a formulation of compatible components having reactivity at low temperatures.

Another object of this invention is to develop a formulation having an adequate viscosity for spraying and mixing with the agents on the contaminated surfaces.

Another object of this invention is to develop a formulation which will produce no corrosive effects on metals and negligible corrosive effects on other common materials.

Other objects and uses of this invention will appear hereinafter in the following detailed description.

This invention results from a need for a decontaminating material which can be successfully employed against all known persistent chemical agents. Prior to instant invention the mustard gases were decontaminated by DANC which is a 6¼% solution of 1.3-dichloro-5,5-dimethylhydantoin in acetylene tetrachloride. The nerve gases were decontaminated by a caustic solution. Both DANC and the caustic solutions are very corrosive to metals, and DANC has a further disadvantage because it is toxic. Because of these disadvantages, the decontamination procedures are more complicated in that the decontaminating solutions must themselves be expeditiously removed from metallic materials. Furthermore the supply problems involved are greatly encumbered by the fact that two decontaminating materials are required for decontaminating these persistent chemical agents.

I have devised a decontaminating solution that consists of by weight sodium hydroxide 1–10%, 2-methoxyethanol otherwise known as ethylene glycol monomethyl ether 20 to 40% and an amine 50–79%, either a primary, secondary or tertiary amine but preferably diethylenetriamine or ethylene diamine or a mixture of the two amines. The purpose of the amines is to aid in breaking down the mustard agents and the nerve agents into harmless decomposition products. The ethylene glycol monomethyl ether gives the solution the desired viscosity and dissolves the NaOH. The NaOH has the purpose of increasing the reaction rate of the constituents. Because of special military requirements the best over-all formulation was found to be DS–2 which is a mixture of diethylentriamine/ethylene glycol monomethyl ether/NaOH in a 70/28/2 ratio respectively. Other possible formulations within the ranges stated above, however, are intended to be covered since all of these solutions decontaminate the persistent agents. These different formulations are not as good as the selected formulation DS–2 because of poorer physical characteristics such as viscosity, rate of reaction, etc. The characteristics of DS–2 are set forth in the following tables to shown the reasons for its selection as the best formulation within the stated range.

TABLE I

*Reactivity of Decontaminations Solutions, DS–2, With Agents*

| Agent | Quantity of agent used [1] | Temperature, °C. | Agent neutralized at indicated time in minutes | | | | |
|---|---|---|---|---|---|---|---|
| | | | 1 | 5 | 10 | 30 | 60 |
| | Pct. | | Pct. | Pct. | Pct. | Pct. | Pct. |
| H | 2.5 | 25 | | 100 | | | |
| H | 0.5 | −25 | | | | 99 | 100 |
| GA | 10 | 25 | | | | 98 | |
| GA | 5 | 25 | | | 99 | | |
| GA | 2 | 25 | | | 100 | | |
| GA | 10 | −30 | | | | 82 | |
| GA | 3 | −30 | | | | 96 | |
| GA | 1 | −30 | | | | 100 | |
| GB | 10 | 25 | | 100 | | | |
| GB | 2 | −30 | | 100 | | | |
| EA1701 | 10 | 25 | 100 | | | | |

[1] Percent by weight added to DS–2 solution.

Data in Table I show the DS–2 solution will decontaminate 2.5% H, 2% GA, 10% GB and 10% EA1701 at 25° C. At low temperatures (−25° C. to −30°C.) the solution will decontaminate 0.5% H, 1% GA and 2% GB.

In this table, H stands for mustard and the GA (Tabun), GB (Sarin) and EA1701 are specific types of nerve gases.

Data in Table I show that the solution had less reactivity with GA than GB. Personnel were of the opinion that the reactivities should be the same, and that in the case of GA, decomposition products in large quantities were interfering with the analysis. To prove the solution was more than adequate from a field standpoint, painted metal panels were contaminated with GA and decontaminated with DS–2 solution. Thirty minutes after decontamination, reduction of vapor hazard was determined. Results are given in Table II.

TABLE II

*Decontamination of Painted Metal Panels Contaminated With GA*

[0.3 oz./sq. yd. GA in paint]

| Method of applying DS–2 solution to panel | Reduction of GA vapor from panel compared to control panel 30 minutes after applying DS–2 solution, percent |
|---|---|
| Spray | 99.3 |
| Spray (DS-2) solution awshed off before sampling) | 100 |
| Swab | 100 |
| Brush | 100 |

Data in Table II show that DS–2 solution applied to GA contaminated surfaces in any manner essentially eliminates the vapor hazard. As essentially 100% reduction of vapor hazard was obtained, the solution cannot be improved.

Immersion corrosion tests were run on several metals. Table III will show the results of these tests.

TABLE III

*Corrosion of Metals by Decontaminating Solution, DS–2*

| Metal | Corrosion rate at 25° C. (96-hr. immersion), mils×10⁻⁴/day | Visual observation after brushing solution on metal panel and allowing solution to remain on surface for 60 hr. at 25° C. |
|---|---|---|
| Steel mild | 0 | No effect. |
| Brass | 0 | Darkened, no corrosion. |
| Aluminum alclad | 0 | No effect. |
| Aluminum 24ST | 0 | |
| Magnesium | 0 | Slight discoloration, no corrosion. |

A number of materials, such as sateen and wool cloth, several rubbers and several plastics were immersed in the DS–2 solution for 24 hours. Change in tensile strength, thickness and visual observations were made upon completion of test.

Data in Table IV show that the DS–2 solution is in general not harmful to cotton cloth, plastics, rubbers, etc. Wool is dissolved by the solution.

TABLE IV

*The Effects of Decontaminating Solution, DS–2, on Cloth, Plastics and Rubbers After 24-Hour Immersion at 25° C.*

| Material | Loss in tensile strength, percent | Thickness, mils Before | Thickness, mils After | Visual observations |
|---|---|---|---|---|
| Sateen, od 8.5 oz./sq. yd | 14 | | | |
| Wool | | | | Dissolved. |
| Natural rubber | 25 | 40 | 40 | |
| GRS rubber | 12 | 42 | 43 | |
| Neoprene rubber | 4 | 91 | 91 | |
| Butyl rubber | 0 | 31 | 31 | |
| Plexiglas | | | | Unaffected. |
| Bakelite, cloth laminate | | | | Do. |
| Bakelite, fibre filled | | | | Do. |

TABLE V

*Viscosity of Decontaminating Solution, DS–2*

| Temperature, ° C. | Viscosity, cp. |
|---|---|
| 25 | 7.2 |
| 0 | 32.2 |
| −5 | 45 |
| −10 | 66 |
| −15 | 95 |
| −20 | 106 |
| −25 | 232 |
| −30 | 405 |
| −35 | 775 |

Note.—Specific gravity was 0.9800 $^{29}/_{60}$

Flash point of DS–2 solution was determined in a Pensky-Martens closed cup, electrically heated, ASTM flash point tester. Flash point is 79.6° C. (175° F.).

Flash point of DS–2 solution is such that no fire or explosion hazards should be encountered under field conditions.

Painted and unpainted metal panels (6 in. x 6 in.) were contaminated with HD and GA to the following densities:

HD—unpainted panels—3 oz./sq. yd.
HD—painted panels—1.3 oz./sq. yd. in paint.
GA—unpainted panels—3 oz./sq. yd.
GA—painted panels—0.3 oz./sq. yd. in paint.

The panels were placed in a vertical position and either sprayed with DS–2 solution or brushed with DS–2 solution. When the panels had drained (approximately 5 minutes) they were placed in a container with an air velocity of 5 m.p.h. over the contaminated face of the panel. The effluent air was sampled with bubblers and the contents analyzed for HD and for GA. Results are given in Table VI.

TABLE VI

*Decontamination of Painted and Unpainted Metal With DS–2 Solution*

| | Concentration of agent vapors for the indicated condition, mmg./l. | | | | | | | | | | | |
|---|---|---|---|---|---|---|---|---|---|---|---|---|
| | HD | | | | | | GA | | | | | |
| Time after decontamination, min. | Unpainted metal | | | Painted metal | | | Unpainted metal | | | Painted metal | | |
| | Control | Sprayed with DS–2 | DS–2 brushed on | Control | Sprayed with DS–2 | DS–2 brushed on | Control | Sprayed with DS–2 | DS–2 brushed on | Control | Sprayed with DS–2 | DS–2 brushed on |
| 0–10 | 125 | 0.5 | 0 | 97 | 22 | 21 | 18 | 0 | 0 | 10.2 | 0 | 0 |
| 10–20 | 98 | 0.5 | 0 | 59 | 20 | 19 | 17 | 0 | 0 | 10.2 | 0 | 0 |
| 20–30 | 71 | 0.5 | 0 | 49 | 9 | 16 | 17 | 1 | 0 | 10.2 | 0 | 0 |
| 30–40 | 55 | 0.5 | 0 | 47 | 7 | 11 | 17 | 1 | 0 | 6.6 | 0 | 0 |
| 40–50 | 53 | 0.5 | 0 | 42 | 6 | 7 | 15 | 1 | 0 | 7.7 | 0 | 0 |
| 50–60 | 43 | 0.5 | 0 | 39 | 4 | 4 | 15 | 0 | 0 | 7.7 | 0 | 0 |
| 60–70 | | | | 29 | 4 | 4 | 15 | 0 | 0 | 5.6 | | |
| 70–80 | | | | 27 | 3 | 2 | 15 | 0 | 0 | 3.9 | | |
| 80–90 | | | | 20 | 2 | 2 | 13 | 0 | 0 | 3.9 | | |
| 90–100 | | | | 19 | 2 | 1 | 8.5 | 0 | 0 | 3.9 | | |
| 100–110 | | | | 15 | 1.5 | 1 | 8.5 | 0 | 0 | 1.9 | | |
| 110–120 | | | | 14 | 0.6 | 0.4 | 6 | 0 | 0 | 0.8 | | |

Note.—Air velocity over panels, 5 m.p.h.

Viscosity determinations were made with the Ostwald-Fenske modification of the Ostwald viscosimeter over a temperature range of 25° C. to −35° C.

Data in Table V show that the viscosity of the DS–2 solution increases with decreasing temperature. The viscosity is only significant with respect to spraying from apparatus and spray tests have shown that DS–2 solution is sprayable down to −25° F. in a spay apparatus.

Data in Table VI show that DS–2 solution is an effective H and G agent decontaminant for painted and unpainted surfaces whether applied by spray apparatus or brush.

The results of the many tests show that both mustard and nerve gases are decontaminated satisfactorily by DS–2, that DS–2 is not corrosive to metals under normal conditions, that in general DS–2 is not harmful to cotton cloths, plastics and rubber; that it is sprayable down to −25° F., that DS-2 is extremely stable under all climatic conditions in cheap steel containers, and because of these advantages, it is the best of all the decontaminating solutions. All of the other decontaminating solutions within the ranges stated previously will also decontaminate all known persistent chemical agents. These solutions, however, offer in one form or another some disadvantages that limit their usefulness in all types of conditions for which our country must be prepared.

I claim:

1. A composition for decontaminating surfaces of all known persistent chemical warfare agents which consists of a mixture by weight of NaOH—1 to 10%, ethylene glycol monomethyl ether—20 to 40%, and ethylene diamine—50 to 79%.

2. A composition for decontaminating surfaces of all known persistent chemical warfare agents which consists of a mixture by weight of NaOH—1 to 10%, ethylene glycol monomethyl ether—20 to 40% and diethylenetriamine—50 to 79%.

3. A composition for decontaminating surfaces of all known persistent chemical warfare agents which consists of a mixture by weight of diethylenetriamine, ethylene glycol monomethyl ether and NaOH in a 78/20/2 ratio respectively.

References Cited in the file of this patent

UNITED STATES PATENTS

| | | |
|---|---|---|
| 2,921,031 | Scherr | Jan. 12, 1960 |
| 2,931,844 | Scherr | Apr. 5, 1960 |
| 2,933,453 | Burks | Apr. 19, 1960 |
| 2,937,037 | Albert et al. | May 1, 1960 |

FOREIGN PATENTS

| | | |
|---|---|---|
| 499,403 | Canada | Jan. 19, 1954 |